United States Patent

[11] 3,593,950

| [72] | Inventor | Heinrich F. Tetzlaff<br>St. Paul, Minn. |
|---|---|---|
| [21] | Appl. No. | 767,783 |
| [22] | Filed | Oct. 15, 1968 |
| [45] | Patented | July 20, 1971 |
| [73] | Assignee | Toro Manufacturing Corporation<br>Minneapolis, Minn. |

[54] CORD STRAIN RELIEF DEVICE
4 Claims, 7 Drawing Figs.

[52] U.S. Cl. ................................................ 248/52,
24/16, 248/60, 248/74
[51] Int. Cl. .................................................. F16l 3/14
[50] Field of Search............................................. 248/74 P,
52, 51, 60; 24/30.5, 16

[56] References Cited
UNITED STATES PATENTS

| 1,968,884 | 8/1934 | Gilbert | 248/52 |
| 2,690,892 | 10/1954 | LaBar | 248/52 |
| 2,715,002 | 7/1955 | Davis | 248/51 |
| 3,255,501 | 6/1966 | Laguerre | 24/16 |
| 3,438,095 | 4/1969 | Evans | 24/16 |

FOREIGN PATENTS

| 779,563 | 7/1957 | Great Britain | 248/51 |
| 1,095,604 | 12/1967 | Great Britain | 248/51 |
| 230,292 | 11/1958 | Australia | 24/16 |
| 1,075,876 | 4/1954 | France | 24/30.5 |
| 1,309,873 | 10/1962 | France | 24/16 |

Primary Examiner—Chancellor E. Harris
Attorneys—Vernon A. Johnson and Thomas A. Lennon ABSTRACT: A device for suspending a cord such as an electric cord from a support to prevent straining and premature failure of the cord. The device consists of a flat elongate flexible member which is wrapped around the cord and secured thereto so as to prevent relative movement therebetween by means of a slot formed in one end thereof, which slot receives the other end of the member, with detent means formed in the member so that when the member is in enclosing supporting relationship with the cord, the detent means engages the portion of the member defining said slot to hold the member on the cord. The outer end portion of the end which is inserted in the slot is provided with an opening for connection to the cord supporting member.

PATENTED JUL20 1971
3,593,950
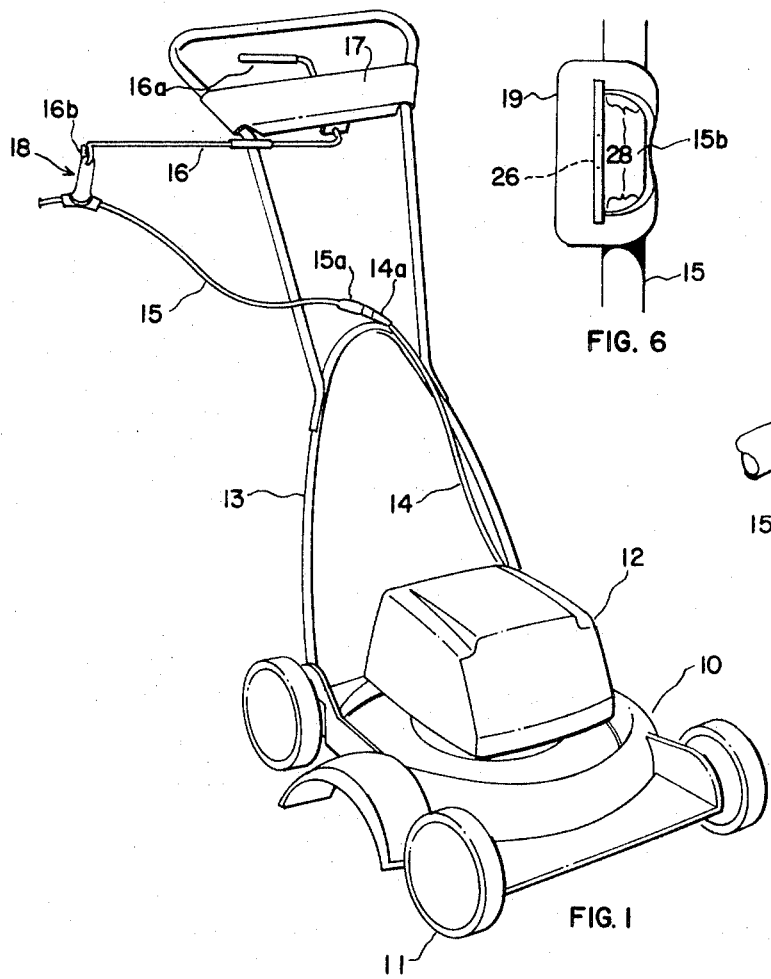
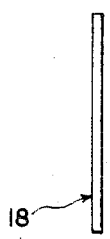
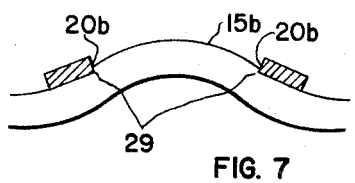
INVENTOR.
HEINRICH F. TETZLAFF
BY Thomas H. Lennon
ATTORNEY

CORD STRAIN RELIEF DEVICE

The strain relief device of this invention has been designed specifically for use with electric mowers, but the use of the device is not necessarily limited to this specific application.

Electric mowers have a substantial length of electric cord (commonly 100 feet or more) which is connected to a suitable outlet, usually at the outside of the house, for powering the electric motor of the mower. This cord is preferably supported near the mower such as by means of a control rod to assist in keeping the cord a safe distance from the mower and out of the path of travel thereof so that it will not be cut during mowing. This cord support may consist of an arm which is moveable from one side of the mower to the other to position the cord on the side of the mower facing the outlet In any event, whether the cord support is itself moveable or not, the cord at its point of support is repeatedly flexed during use and tends to rub against the support so that the combination of the friction and the flexing causes the cord to rapidly wear out at the flexure and friction point.

Also, the major portion of the cord length between the motor and the outlet is an extension cord which is connected at the mower to a short length of cord extending from the motor. The end of the extension cord connected to the motor cord is commonly subjected to a pulling force thereby causing disconnection of the extension cord and motor cord and inconvenient unintentional stopping of the motor. This pulling force may be caused by the flipping movement of the cord supporting arm, or by the operator or someone else stepping on a portion of the cord on the ground.

Therefore, it is an important object of this invention to provide a cord supporting device which will minimize or eliminate such flexing and friction so as to provide for a longer cord life.

Another important object is to provide a cord supporting device which will prevent inadvertent disconnection of the extension and motor cords.

More specifically, it is an object of this invention to provide a device which will suspend the cord from the cord support in such a manner that the cord will not be in direct contact with the support and will be supported and enclosed by the device and held by the device against movement relative thereto in a manner in which there will be little frictional wear between the device and the cord and will substantially eliminate any significant kinking or sharp bending or flexing of the cord which might produce premature failure at that point, and will fix the position of the cord relative to its support so that no disconnecting pulling force can be applied thereto by movement of the supporting arm or pulling on the extension cord on the outlet side of the supporting device.

These and other objects will become apparent from the following description and drawings accompanying same in which:

FIG. 1 is a perspective view of a mower embodying one preferred form of cord strain relief device of this invention;

FIG. 2 is a plan view of the device;

FIG. 3 is an end view of the device;

FIG. 4 is a close up front view of the device mounted on the cord;

FIG. 5 is a cross-sectional view taken along the line 5-5 of FIG. 4;

FIG. 6 is a top view of FIG. 4, and

FIG. 7 is an enlarged broken away section of FIG. 4 illustrating the manner in which the strain relief device lockingly engages the cord to prevent relative movement therebetween.

Referring to the drawings, FIG. 1 shows a rotary lawn mower having a housing 10 which encloses a horizontal cutter blade (not shown), ground wheels 11, and electric motor enclosed within shroud 12, and a steering handle 13. An electric cord 14, the lower end of which is operatively connected to the motor, extends upwardly and rearwardly therefrom, terminating in a plug connector 14a, the motor cord 14 being supported by the handle 13.

To connect the motor with an electrical source, such as a house outlet, an extension cord 15 is provided, which is operatively connected with the motor cord by means of receptacle connector 15a which receives plug 14a said extension being supported by a cord control rod 16, which rod is pivotally mounted and supported by the escutcheon plate 17. The extension cord 15 is suspended from the rod 16 by means of the strain relief device 18 of this invention. The rod illustrated is of the type which is capable of being flipped or swung from side to side to selectively position the cord on opposite sides of the mower, the rod being swung from side to side by manipulation of the handle 16a thereof.

The unmounted strain relief device 18 is best illustrated in FIG. 2. The device is formed of a single thin flat piece of flexible resilient durable smooth material such as plastic. It somewhat resembles in plan view a conventional bottle opener. The device has an enlarged cord enclosing end 19 which has a semicircular or D-shaped slot or opening 20 formed therein. The enlarged head has inwardly converging tapered sides 21, the inner ends of which terminate at laterally extending shoulders 22, which shoulders define with sides 21 recesses 27 and serve as locking tabs or detents in a manner hereinafter described. The rear portions of the detents are defined by inwardly rearwardly tapered edges 23 which taper gradually rearwardly until they merge with straight sides 24 which continue rearwardly to the rounded outer end 25 which has a circular opening 26 formed therein, this end portion of the device also being referred to as the suspension end.

The opening 20 is defined by a straight transverse sidewall 20a and a semicircular sidewall 20b. The transverse dimension X between the sides 24-24 is slightly less than the diameter of the opening 20 as represented by the length of side 20a, to facilitate insertion of the suspension end into opening 20. The transverse dimension Y between the tips of the shoulders 22 is greater than said diameter of opening 20 to enable said shoulders to function as detents when the device is mounted on the cord. The transverse dimension Z between the recesses 27 is just slightly less than said diameter of opening 20.

In use, the extension cord is placed against the enlarged cord end portion 19 transversely of the device so that it is in inwardly spaced relationship to the straight side 20a of the opening 20. The relief member is then bent in encircling relationship to the cord and the smaller rounded suspension end 25 of the member is inserted into the opening 20 in the space between the cord and the straight side 20a. This end is pulled through the opening 20 until the shoulders 22 lockingly engage the curved edge 20b of the opening 20, at which point the relief device closely encloses the cord and is locked thereon.

As the suspension end is pulled through opening 20, it does not encounter any resistance as the side edges 24 pass through the opening, since this dimension is smaller than the opening. However, when the tapered side edges 23 reach the opening 20, they engage the curved sidewall 20b thereof, and as further pulling continues, the flexibility of the material enables the tapered portions to deform and bend inwardly sufficiently to enable the tapered portions 23 and shoulders 22 to pass through opening 20. As soon as the shoulders 22 pass the curved sidewall 20b, the resiliency thereof causes them to snap back to their normal position and thereby lock the two end portions of the device together in encircling relationship to the cord, the curved sidewall 20b in this situation being seated in the recesses 27, with the shoulders 22 overlying the side 20b. When so assembled, the cord and relief device appear as in FIG. 1, and 4-7, inclusive.

The relief device is preferably designed so that no relative movement is possible between the device and the cord. To accomplish this, the detents are positioned along the length of the device so that when the device is locked on the cord, it tightly grips the cord. In addition, the cutout or opening 20 is so dimensioned that the portion 15b of the cord exposed thereto is slightly kinked, bowed, or deformed between and gripped by opposite sides of the curved sidewall 20b as best seen in FIGS. 4 and 7. Thus, referring to FIG. 6, the top of the cord is gripped by curved wall 20b at opposite sides 28. Referring to FIG. 7, the leading inner corner or edge 29 of opening sidewall 20b is shown biting into and slightly depressing the outer surface of the cord on opposite ends of the bowed portion 15b of the cord so as to firmly grip same and prevent any relative movement between the device and the cord.

When the strain relief device is secured to the cord in the manner hereinbefore described, it is then ready for suspension from the cord supporting member which in the illustrated embodiment is the cord control rod 16. This rod has a loop or hook portion 16b formed on the outer end thereof over which the opening 26 is fitted so as to suspend the relief device and cord therefrom, as illustrated in FIG. 1.

Thus, the cord is supported by the relief device over a substantial portion of its length in such a manner that there is no significant sharp flexing of the cord at the point of suspension. There is no frictional activity between the suspension cord and the relief device and therefore no wear thereon due to friction which might cause premature failure. The device itself is relatively inexpensive and simple to make, and is very easy to attach to the cord and to the supporting structure.

In the illustrative example, when the mower is to be used the connector 15a of the extension cord 15 is connected to the connector 14a of the motor cord, the opening 25 of the strain relief device is installed on the hook 16a of the support arm 16, and the other end of the extension cord is plugged into a suitable electrical outlet. The strain relief device 18 is installed on the extension cord a sufficient distance from the connector 15a so that there is some play in the cord between the relief device and the connector throughout the entire range of movement of the support arm 16. Since the relief device cannot move relative to the extension cord, no pulling force will develop on the connector 15a due to flipping of the cord, and no pulling force can be applied to the connector 15a by a force applied to the extension cord between the relief device and the outlet. Thus, there should be no inadvertent disconnection of the extension cord from the motor cord and inadvertent stoppage of the motor.

It will, of course, be understood that various changes may be made in form, details, arrangement and proportions of the various parts without departing from the scope of this invention.

What I claim is:

1. A device for suspending an elongated flexible element including a cord from a supporting structure comprising:
   an elongate flexible member,
   a first opening formed in one end of said member,
   the other end of said member being insertable in said opening to completely enclose said element,
   means forming a part of said other end for attaching said member to said supporting structure,
   said member frictionally engaging said element in a manner whereby said frictional engagement prevents relative movement between said member and said element,
   wherein said element is gripping and depressed by the inner edge of the wall portion, defining said first opening to prevent relative movement between said element and member.

2. A device for suspending an elongate flexible element including a cord from a supporting structure comprising:
   an elongate flexible member,
   a first opening formed in one end of said member,
   the other end of said member being insertable in said opening to completely enclose said element,
   means forming a part of said other end for attaching said member to said supporting structure,
   said member frictionally engaging said element in a manner whereby said frictional engagement prevent relative movement between said member and said element,
   wherein when said member is installed on said element in enclosing relationship therewith, a portion of said element faces said first opening,
   said portion being bowed outwardly and deformed by the enclosing action of said member so as to extend through and outwardly of said opening,
   the ends of said portion being frictionally gripped and slightly depressed by the edge of the wall portion of said first opening to positively prevent relative movement between said member and said element.

3. In a ground traversing implement powered by an electric motor,
   electric cord means attached to said motor and connectable to a source of electrical energy remote from said implement while in use.
   a device for suspending said cord means from said implement,
   said device being attachable to said implement and attachable to said cord means in a manner which prevents relative movement between said device and said cord means,
   wherein said cord means includes a first cord portion having one end connected in circuit with said motor and the other end provided with first connector means,
   said cord means including a second extension portion having second connector means operatively connectable with said first connector means for connecting said motor with a source of electrical power for energizing same,
   said implement including a swingable cord supporting arm for moving the extension cord from one side of the implement to the other,
   said device connecting said extension cord with said arm,
   said device frictionally engaging said extension cord in a manner which prevents relative movement between said device and said extension cord in the area of frictional engagement therebetween,
   said arm swinging in a predetermined defined path of travel in which the distance between said connectors and said device as measured along said cord remains constant throughout said path of travel.

4. A device for suspending an elongate flexible element including a cord from a supporting structure comprising:
   an elongate flexible member,
   a first opening formed in one end of said member,
   the other end of said member being insertable in said opening to completely enclose said element,
   means forming a part of said other end for attaching said member to said supporting structure,
   said member frictionally engaging said element in a manner whereby said frictional engagement prevents relative movement between said member and said element,
   wherein said device comprises:
   an elongate member formed of a single flexible flat thin piece of sheet material,
   said member having a first end portion having straight parallel sides terminating in a curved terminal end,
   said member having an intermediate portion including a pair of tapered sides which merge with and are extensions of said aforementioned parallel sides, said tapered portions being in outwardly diverging relationship as they extend towards said second end portion, each of said tapered portions terminating in a locking shoulder,
   said member having a second end portion of a larger width dimension than said first and intermediate portions,
   said second end portion having tapered side portions which merge with the first mentioned tapered side portions of said intermediate portion to define therewith said locking shoulders,
   said second end portion having an opening formed therein capable of receiving said first end portion,
   said opening having a straight side transverse to the longitudinal dimension of said member and a generally semicircular side,
   said first end portion being capable of being pulled through the opening of said second end portion until said locking shoulder lockingly engages the semicircular wall portion of said member defining said opening.